United States Patent
Li

(10) Patent No.: US 11,603,317 B2
(45) Date of Patent: Mar. 14, 2023

(54) BINDER-FREE AND FOULING-RESISTANT CNT THIN FILM MEMBRANE

(71) Applicant: 4th Phase Water Technologies, LLC, West Chester, PA (US)

(72) Inventor: Chunhong Li, West Chester, PA (US)

(73) Assignee: 4TH PHASE WATER TECHNOLOGIES, LLC, West Chester, PA (US)

( * ) Notice: Subject to any disclaimer, the term of this patent is extended or adjusted under 35 U.S.C. 154(b) by 511 days.

(21) Appl. No.: 16/699,264

(22) Filed: Nov. 29, 2019

(65) Prior Publication Data

US 2020/0255292 A1 Aug. 13, 2020

Related U.S. Application Data

(60) Provisional application No. 62/772,782, filed on Nov. 29, 2018.

(51) Int. Cl.
| | |
|---|---|
| *C01B 32/17* | (2017.01) |
| *C01B 32/159* | (2017.01) |
| *B01D 67/00* | (2006.01) |
| *B01D 69/06* | (2006.01) |
| *B01D 69/02* | (2006.01) |

(52) U.S. Cl.
CPC .......... *C01B 32/17* (2017.08); *B01D 67/0083* (2013.01); *B01D 69/02* (2013.01); *B01D 69/06* (2013.01); *C01B 32/159* (2017.08); *B01D 2323/08* (2013.01); *B01D 2325/04* (2013.01); *B01D 2325/28* (2013.01); *B01D 2325/36* (2013.01); *C01B 2202/02* (2013.01); *C01B 2202/04* (2013.01); *C01B 2202/06* (2013.01); *C01B 2202/26* (2013.01); *C01P 2004/03* (2013.01)

(58) Field of Classification Search
CPC ... C01B 32/17; C01B 32/159; C01B 2202/02; C01B 2202/04; C01B 2202/26; B01D 67/0083; B01D 69/06; B01D 2323/08; B01D 2325/04; B01D 2325/28; B01D 2325/36

See application file for complete search history.

(56) References Cited

U.S. PATENT DOCUMENTS

| | | | |
|---|---|---|---|
| 2011/0193071 A1* | 8/2011 | Yahagi | C08F 12/24 257/40 |
| 2012/0228157 A1* | 9/2012 | Li | B82Y 30/00 977/734 |

FOREIGN PATENT DOCUMENTS

| | | | | |
|---|---|---|---|---|
| CN | 103771387 B | * | 8/2016 | B82Y 30/00 |

* cited by examiner

*Primary Examiner* — Ryan B Huang
(74) *Attorney, Agent, or Firm* — Ryan L. Marshall; Barnes & Thornburg LLP

(57) ABSTRACT

A hydrophilic graphitic material is provided that may be formed by heating a graphitic material to a temperature between about 150° C. to about 1400° C. for an extended period of time under an inert atmosphere. Annealing CNT film at 500 to 1400 removes amorphous carbon to produce purified CNT film. The purified CNT film can be further densified with the treatment of alkylphosphonic acid or alkyldiphophonic acid and heating to produce a hydrophilic, densified CNT film which is mechanically robust and does not adhere to other solid surfaces. These films can be used as filtration membranes with superior membrane fouling resistance among other uses.

18 Claims, 11 Drawing Sheets

(A)

(B)

(A)

(B)

(A)

(B)

BINDER-FREE AND FOULING-RESISTANT CNT THIN FILM MEMBRANE

CROSS-REFERENCE TO RELATED APPLICATIONS

This application is a U.S Non-Provisional application, which claims the benefit under 35 U.S.C. § 119(e) of U.S. Provisional Application No. 62/772,782, filed Nov. 29, 2018. The disclosure of the priority application is incorporated by reference herein in its entirety.

FIELD OF DISCLOSURE

The disclosure generally relates to the preparation of a binder-free, fouling-resistant CNT thin film membrane. More specifically, the disclosed system and method relate to the understanding of water-CNT surface interactions and the process to render the CNT film hydrophilic. The disclosed system and methods also relate to the removal of disorderly amorphous carbon component on the CNT film membrane surface to produce purified CNT film. The resulting CNTs have more uniform diameter distribution and are more crystalline in structure. Such purified CNT film membrane can be further densified with the use of small amphiphilic molecules at elevated temperature. The disclosed CNT materials can be used as filtration membranes for water and organic solvents with little or no propensity toward surface fouling among other uses.

BACKGROUND

Membrane filtration provides effective solutions to remove contaminants and has been applied in numerous applications. Achieving high permeability, good selectivity, and antifouling ability, however, remains a great challenge for existing membrane filtration technologies.

Carbon nanotubes (CNTs) are ideal candidates as membrane material due to their extraordinary mechanical strength and chemical stability. Recent advances in CNT research has further demonstrated that a thin layer of water molecules (layer thickness in the range of nanometers) can wrap around single-walled CNT. This layer of water is intimately interacting with CNT and thus behaves very differently from typical bulk water. For example, it is difficult to remove such a layer of water even under high vacuum at elevated temperature based on theoretical calculations.

Introducing a layer of orderly water near the CNT surface would be a clean way to make a CNT film hydrophilic. Such CNT membranes can overcome membrane fouling issues. A structured water layer also becomes an integral part of the membrane and could, therefore, facilitate the removal of small particles, organic molecules, and even ions present in aqueous solutions.

Pristine CNTs (where amorphous carbon is removed), however, are known to be hydrophobic. There has been no efficient way of rendering CNT powder and CNT film hydrophilic for water filtration applications.

Most CNT membranes in literature are CNT polymer composites. CNT powders are generally functionalized with surface functional groups and dispersed in organic solvents with polymer materials to produce CNT film membranes. There are major challenges with this approach: (1) the difficulty in controlling the degree of surface functionalization on CNT; (2) the non-uniform dispersion of CNT in polymer solution as CNTs tend to bundle; (3) chemical and physical means tend to damage CNT structure and result in CNTs with even broader distribution in length and diameter; (4) uneven pore distribution in CNT/polymer composite films; (5) most organic polymers are not resistant to organic solvent and thus CNT polymer composite membranes have little tolerance toward organic solvents; and (6) organic polymers degrade over time and polymer degradation not only compromises the efficiency of the membrane, it also leads to the loss of dispersed CNT in the membrane. Leaching of nanomaterials has become a great environmental concern.

CNT film membranes without any polymer binders can overcome the above challenges due to the superior chemical and physical stability of CNT. Such CNT films can also resist acid, base and organic solvent as membranes. At present, the most productive method to produce CNT films is by floating catalyst chemical vapor deposition (FCCVD). Catalyst precursor is first dissolved in feed stock solution and injected into a furnace oven at ~1200° C. along with feed gases (such as $N_2$ and $H_2$). The catalyst quickly decomposed to form nanoparticles that initiate the growth of CNT. Such CNT fiber is pulled out of the furnace, wound, and molded into thin CNT film membranes. The growth process is fast, and, as a result, as-grown CNTs in the film are inherently imperfect in structure. There is generally considerable amount of amorphous carbon on the CNT surface. The CNT wall could also have many defects, thus giving CNTs of various level of crystallinity from batch to batch. It is also possible that the amount of amorphous carbon is slightly different in each batch. Individual CNT diameter and length (thus aspect ratio) are bound to be non-uniform too. Various factors can contribute to the variation of CNT quality including catalyst, catalyst concentration, catalyst particle size, feed stock, feed gas and feed gas flow, furnace temperature, and so on. Thus, it is challenging to reproduce CNTs of similar quality.

As CNTs are wound into a thin film, the winding speed, winding force, solvent used to wet the pristine film, and pressing force on the film can affect film thickness, tube density, tube alignment, and pore distribution, for example. Therefore, highly reproducible CNT film membranes are extremely difficult to produce on a large scale.

CNTs tend to bundle together, but bundling itself is generally not strong enough to meet the tensile strength requirement for filtration membrane. Such films tend to rupture under pressure or tear. Without polymer binder, CNTs tend to stick to other solid surfaces such as Teflon, plastics, and metal surfaces. Such tendency results in CNT loss and makes processing CNT films difficult. In addition, various levels of amorphous carbon content in pristine CNT films also contribute to the hydrophobicity of such film membranes and result in low water permeation. Such film membranes are also prone to foul.

The disclosure describes in detail methods to solve the above problems related to CNT film membranes.

BRIEF SUMMARY

A novel method of preparing a hydrophilic CNT membrane is provided. A pristine CNT film is not hydrophilic. Heating pristine CNT film at a temperature at or above 150° C., at 200° C. or above, at 300° C. or above, at 500° C. or above, at 600° C. or above, at 800° C. or above, at 1000° C. or above, or at 1200° C. for an extended period of time under inert atmosphere may render a CNT film hydrophilic. The permeation rate increases significantly after such heat treatment.

A novel method of minimizing CNT loss from CNT film membranes is also provided. As-grown pristine CNTs have amorphous carbon and structural defects, and the bundling or binding between CNTs is not sufficiently strong when CNTs are not long enough. Thus, CNT loss is a major problem in CNT film membrane when polymer binder is not employed. Heating CNT film membrane in the presence of sacrificial graphite paper at about 500° C. for 5 hours under inert atmosphere results in CNT film with significantly less or no CNT loss.

A novel method of cleaning and purifying a CNT membrane is provided. Annealing a CNT film membrane at high temperature (about 1000° C.) under $N_2$ or $N_2$ mixed with trace $H_2$ for extended period of time greatly improves CNTs tube surface smoothness. CNTs also become thinner with considerable weight loss. Such purifed CNT film membranes have high water permeation and can be used as water filtration membranes.

A method of further densifying purified CNT membrane without mechanical compressing is provided. After annealing at high temperature, a purified CNT film membrane can be further treated with amphiphilic molecules such as alkylphosphonic acids at elevated temperature. The resulting densified CNT films are mechanically robust and do not adhere to other solid surfaces such as Teflon, Nylon film, and metal block surfaces. These films are hydrophobic and can be used as membranes for organic solvent filtration or as membranes to concentrate organic molecules from aqueous solution. They can also be used in flight line portable fuel purifiers to remove trace amount of water in jet fuel. Under high pressure, these membranes could also find use in water desalination process.

A method of preparing a hydrophilic densified CNT film membrane subsequent to the densification process with amphiphilic molecules is provided. Such hydrophilic densified CNT film membranes resist fouling, resist organic solvents, and can with stand harsh corrosive conditions and high temperature.

DETAILED DESCRIPTION

Figure 1:
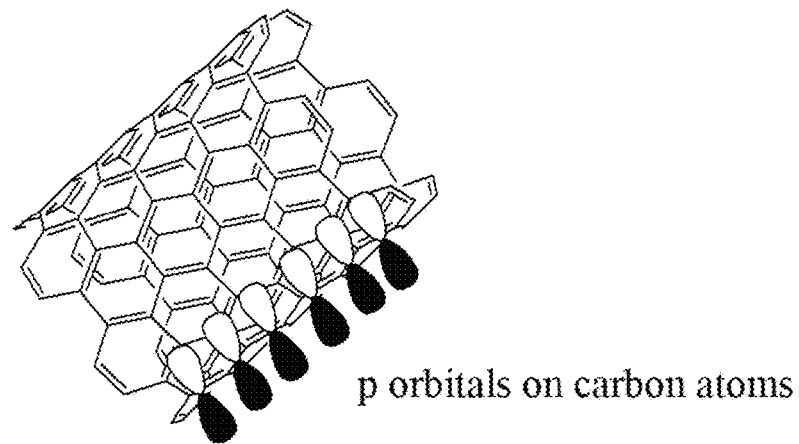
FIG. 1 shows a CNT molecule with p orbital on each carbon atom for molecular orbital recombination.

Even though there exists a large body of research work on improving the anti-fouling property of filtration membranes, to date, no strategy has fundamentally addressed the root cause of fouling. Various strategies have been employed to introduce hydrophilic moieties onto hydrophobic membrane surface. But the number and density of such hydrophilic moieties in most cases are not sufficient. As a result, most commercial filtration membrane surface does not have the requisite hydrophilicity to overcome the three major contributing factors for fouling: hydrophobic-hydrophobic interaction, opposite charge attraction to membrane surface and the most commonly overlooked release of low entropy surface water.

CNT films are superior in their mechanical strength and chemical stability to be used as filtration membrane. CNT films can be synthesized via the established floating catalyst chemical vapor deposition (FCCVD) method. Such pristine CNT films are commercially available. But they have low tensile strength and tend to rupture easily. CNT loss from pristine CNT film is a major problem. And without surface modification to render them hydrophilic, they are poor water filtration membranes with low permeate flux and fouling problems because as-grown CNT films behave as hydrophobic material.

Conventional wisdom suggests that hydrophilic functional groups be introduced to CNT surface via either covalent or non-covalent approaches to render CNT films hydrophilic. However, covalent approaches require the use of caustic chemical reagents and harsh conditions, not to mention the degree of functionalization is difficult to control and quantify. Covalent approaches rely on damaging CNT surface to introduce functional groups, thus compromising the physical and chemical stability of CNT films. Noncovalent approaches rely on the deposition of hydrophilic polymers onto CNT surface. But the accessibility of CNT surface depends on surface morphology and surface energy. Therefore, uniform deposition of polymer material on CNT membrane is very difficult. The long-term stability of the CNT membrane also depends on the stability of the deposited polymer. Over time, the polymer and CNTs could also leach out from the membrane.

There appear to be conflicting views on CNT surface properties in literature. On one hand, materials scientist generally regard CNT as hydrophobic and most chemical literature would teach pristine CNTs are hydrophobic, while more and more theoretical calculations suggest CNT surface interact strongly with orderly water. Recent advance in CNT research has demonstrated that a thin layer of water molecules (layer thickness in the range of nanometers) naturally wraps around single-walled CNT. This layer of water is intimately interacting with CNT and thus behaves very differently from typical bulk water. For example, it is very difficult to remove such a layer of water even under high vacuum at elevated temperature.

The discrepancy might be due to the difference in CNT quality. Theoretical studies are considering CNTs with perfect structure and uniform dimension while synthesized CNTs inevitably have defects and are different in tube length, tube diameter, tube crystallinity and so forth. Generally, there is also amorphous carbon formation during CNT synthesis. Certain variations in the growth and process condition can also lead to difference in CNT film quality.

In order to produce CNT membrane films, as-grown CNTs coming out of the chemical vapor deposition (CVD) furnace are typically wound and wet with an organic solvent such as MeOH or EtOH. The films are then dried and pressed into thin sheets.

CNT films at this stage remain relatively hydrophobic and require high pressure for water to permeate even a film of ca. 10 μm thickness. The poor flux rate is mainly related to the presence of air and amorphous carbon in the film membrane. Adsorption of MeOH or EtOH molecules to CNT surface could also contribute to the hydrophobicity of CNT membrane.

To develop a filtration membrane that is truly hydrophilic, it is critical to understand the unique properties of water and the interaction between water molecules and membrane surface. Such understanding can be the guiding principle in choosing the right membrane material and functional moieties on the membrane material surface.

Amorphous carbon content can be removed to provide cleaner, more crystalline CNTs with considerably higher degree of uniformity in terms of tube diameter and surface smoothness and crystallinity. Such CNTs can be further densified at an elevated temperature for an extended period of time using amphiphilic small molecules such as alkylphosphonic acids. The resulting film membranes have increased tensile strength and little to no tendency to stick to other solid surfaces. Upon further heat treatment under inert atmosphere, such densified CNT films can become hydrophilic, can resist fouling and organic solvents and can withstand high temperature.

CNTs are composed of aromatic structures. Although water molecules have been postulated to interact with aromatic structure via hydrogen atom (H)-$\pi$ interaction, the exact mode of action remains unclear. According to molecular orbital theory, a single CNT can be treated as a large molecule with a large number of carbon atoms. Each carbon atom has one remaining p orbital for $\pi$ molecular orbital recombination (FIG. 1). As a result, a single CNT molecule has a large number of $\pi$ orbitals from these p orbitals and the molecular orbitals have different energy levels. Higher energy level $\pi$ orbitals have more nodes (+ and –). Electrons with higher energy fill up the $\pi$ orbitals at higher energy level. Because of the large number of $\pi$ orbitals, the energy gap between each energy level could be relatively small. Thus, at elevated temperature, such electrons can gain enough energy to jump from lower energy orbitals to higher energy orbitals. A CNT molecule therefore stores up more energy in the form of higher energy electrons in $\pi$ orbitals with more nodes. Because of the extensive delocalization of $\pi$ orbitals, such high energy electrons are stabilized. With more electrons occupy $\pi$ orbitals with more nodes, a CNT molecule with higher energy can be viewed as having more effective charge separation.

Without being bound by any theory, it is believed that CNT membrane hydrophilicity is intimately related to how water molecules interact with CNT surface and how water molecules interact with themselves. CNTs, due to atomic p orbital recombination, have extended conjugation, which result in many molecular orbitals (MO) of different energy level. The highest occupied molecular orbitals (HOMO) and lowest unoccupied molecular orbitals (LUMO) all have nodes as + and –, similar to charge separation. Thus, it is reasonable to view CNT membrane with orderly alternating positive and negative charges (or partial charges) along the surface as having charge separation. Such charge separation can lead to strong interactions between CNTs and other dipoles such as water molecules.

Figure 2:
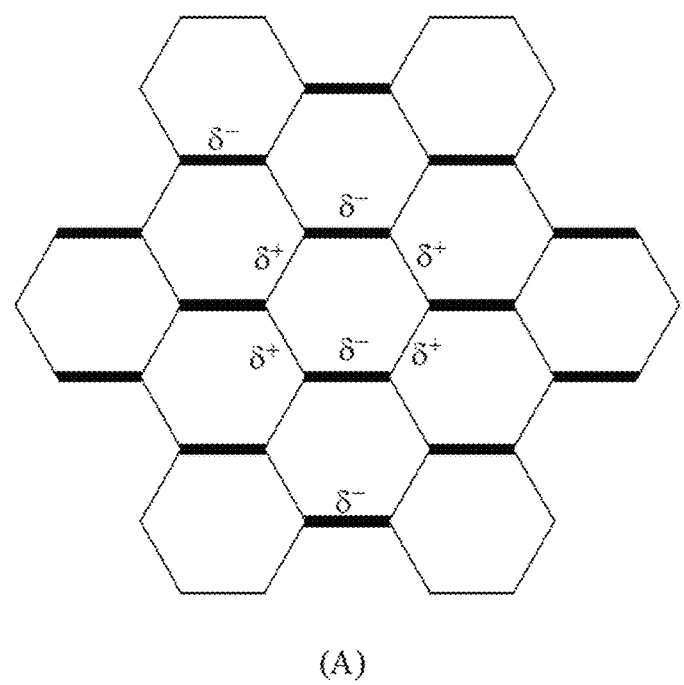
FIG. 2 illustrates (A) the charge separation in CNT—alternating positive and negative charges (or partial charges) across a graphitic surface; (B) Orderly hexagonal arrangement of water clusters that could have charge separation closely matching that in a graphitic surface; (C) Cross-sectional view of the water adsorption layer on CNT with matching positive and negative partial charges.
Figure 2:
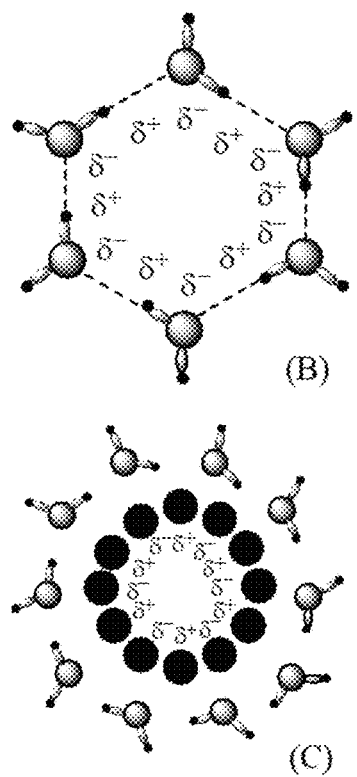

Effective charge separation in CNT and graphene materials has been indicated in recent spectroscopic evidence. Charge separation is due to non-uniform electron density distribution across CNT surface and can be interpreted as having strong dipoles or alternating positive and negative charges (or partial charges) (FIG. 2).

Charge separation can also be viewed as a form of energy stored in CNTs. When the energy level of CNT membrane is raised, more electrons become excited and jump from HOMO to LUMO, increasing the number of occupied orbitals with more nodes, effectively achieving more charge separation. Therefore, more charge separation means higher energy level in CNTs. The extended conjugation system in CNT membrane further stabilizes such charge separation state. As a result, a CNT membrane with large charge separation can remain hydrophilic for a long time.

It has been postulated that CNT surface with more charge separation leads to O—H bond in the surface plane, while CNT surface (hydrophobic, with little charge separation) requires H atoms to be in the surface plane. The first scenario results in large flux and the second scenario renders little or no flux.

The aromatic structures can be very large in CNT and graphene, charge separation thus can span a very large area and become a major contributing factor to their unique properties. Conceivably, in the curved structure of CNT, such charge separation could be even more significant. Recent spectroscopic evidence also indicates charge separation in CNT and graphene materials.

Water molecules also undergo charge separation, especially at interfaces. Recent theoretical calculations also suggest that small water clusters form stable bilayer ice on graphitic surfaces. From a theoretical standpoint, CNT surface intrinsically could interact strongly with dipole molecules such as water. The higher energy state a CNT molecule is in, the stronger the interaction there is between CNT and dipole molecules.

However, pristine CNTs tend to be hydrophobic and without surface functionalization, pristine CNT film membranes generally have low permeability toward polar substances such as water molecules. The discrepancy lies in the inconsistent CNT quality, i.e., CNT crystallinity, diameter, diameter distribution, CNT length, CNT length distribution, aspect ratio, number of defects, amorphous carbon content, etc. A method that can remove amorphous carbon without damaging or shortening the underlying CNT structure can greatly improve CNT quality.

Figure 3:
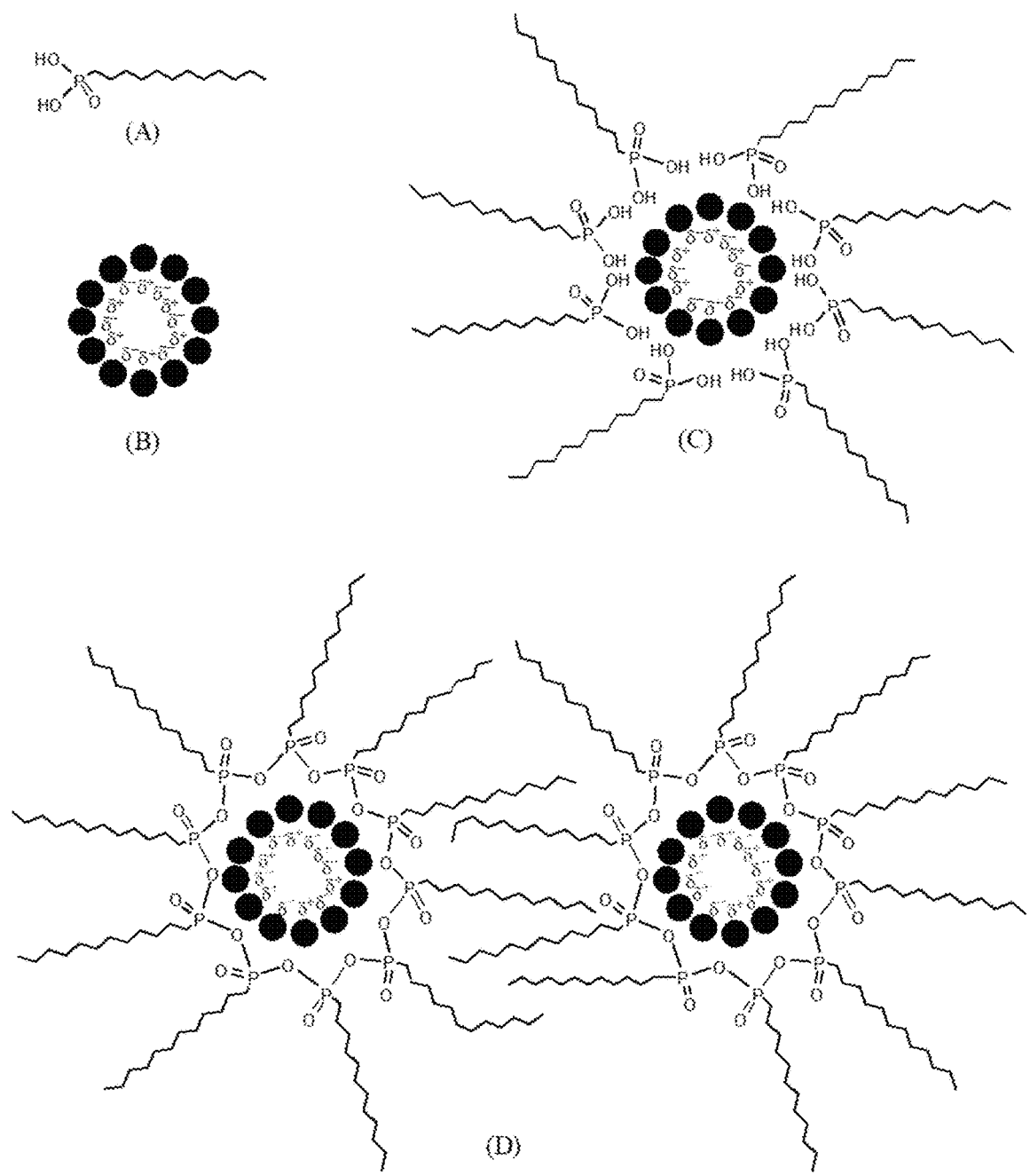
FIG. 3 shows (A) an alkylphosphonic acid molecule with polar head and hydrophobic tail; (B) Cross-sectional view of alternating positive and negative charges (or partial charges) across a graphitic surface (only one molecular layer is shown for brevity); (C) Alkylphosphonic acid molecules form monolayer wrapping CNT structure due to charge separation on CNT surface; (D) Dehydration among alkylphosphonic acid molecules leads to more densely packed monolayer and bilayer formation between adjacent CNTs, and brings CNTs closer and densifies CNT film membrane.

Such purified CNTs can be highly crystalline and hydrophilic due to extensive charge separation across the CNT surface. Polar molecules and the polar moieties of amphiphilic molecules tend to interact preferentially with CNTs. By treating CNTs with amphiphilic molecules such as alkylphosphonic acids, a monolayer of a few nanometer in thickness forms wrapping around CNT surface (FIG. 3). Upon heating, dehydration among molecules in the monolayer further brings the amphiphilic molecules and CNTs closer together to densify CNT films. Upon further heat treatment at 500° C. under inert atmosphere, such densified CNT films can turn from hydrophobic to hydrophilic. The resulting hydrophilic densified CNT film membrane becomes more robust with higher tensile strength and does not lose individual CNTs. Such CNT film membranes can be used as filter membranes for water and organic solvent filtration.

One embodiment of the invention is to treat pristine hydrophobic CNT films at elevated temperature under inert atmosphere for extended period of time to produce hydrophilic CNT films with significant flux rate increase. Upon heating, absorbed small molecules with low boiling point can be removed to expose CNT surface. Although MeOH (b.p. 64.7° C.) and EtOH (b.p. 78.4° C.) have relatively low boiling points, heating CNT films at 100° C. for 20 hours in vacuo or under $N_2$ atmosphere or at 150° C. for 10 hours under $N_2$ atmosphere does not improve film permeation rate. Heating at 150° C. for 20 hours under $N_2$ atmosphere leads to significant permeation increase when tested in a Millipore stainless steel syringe filter holder. With the removal of any adsorbed layer on CNT surface and the increase of energy level (to increase charge separation along CNT surface), CNT films become highly hydrophilic and the flux rate increase dramatically.

Similarly, heating pristine hydrophobic CNT films at 200° C. for 10 hours or 20 hours under $N_2$ atmosphere leads to significant flux improvement of CNT film membrane.

Further, heating pristine hydrophobic CNT films at 300° C. for 16 hours under $N_2$ atmosphere leads to significant flux improvement of CNT film membrane.

Additionally, heating pristine hydrophobic CNT films at 500° C. for 5 hours, 10 hours, or 20 hours under $N_2$ atmosphere leads to significant flux improvement of CNT film membrane.

Furthermore, heating pristine hydrophobic CNT films at 600° C. for 100 min under $N_2$ atmosphere leads to significant flux improvement of CNT film membrane.

Heating pristine hydrophobic CNT films at 800° C. for 80 min or 140 min under $N_2$ atmosphere leads to significant flux improvement of CNT film membrane.

Heating pristine hydrophobic CNT films at 1000° C. for 1 hour, 2 hours, 4 hours, 5 hours, or longer under $N_2$ atmosphere leads to significant flux improvement of CNT film membrane.

Heating pristine hydrophobic CNT films above 1000° C. (e.g., 1100° C., 1200° C.) for 1 hour or longer under $N_2$ atmosphere can also lead to significant flux improvement of CNT film membrane.

A process of purifying a pristine carbon nanotube film is provided. The process may include removing amorphous carbon at temperatures between about 600° C. to about 1200° C. under inert atmosphere for a period of time to produce a purified CNT film.

In some embodiments, the graphitic material being purified may be pristine single-walled, double-walled, or multi-walled carbon nanotube (CNT) film of facial density of from about 0.5 g/m² to about 30 g/m².

In some embodiments, the purifying temperature is about 600° C. and the extended period of time is at least about 100 minutes.

In some embodiments, the purifying temperature is about 800° C. and the extended period of time is at least about 80 minutes or at least about 140 minutes.

In some embodiments, the purifying temperature is about 1000° C. and the extended period of time is about at least 1 hour, about 2 hours, about 4 hours, about 5 hours, or more than about 5 hours.

In some embodiments, the purifying temperature is about 1200° C. and the extended period of time is at least about 1 hour.

In some embodiments, the graphitic material being purified is a pristine single-walled CNT film, double-walled CNT film, multi-walled CNT film, CNT cloth, CNT membrane, or CNT powder.

In some embodiments, the inert atmosphere for the purification process comprises nitrogen, helium, argon, nitrogen containing 1% to 5% hydrogen, helium containing 1% to 5% hydrogen, argon containing 1% to 5% hydrogen, or any combination of gases that would keep graphitic material from oxidation at the temperature.

Figure 4:
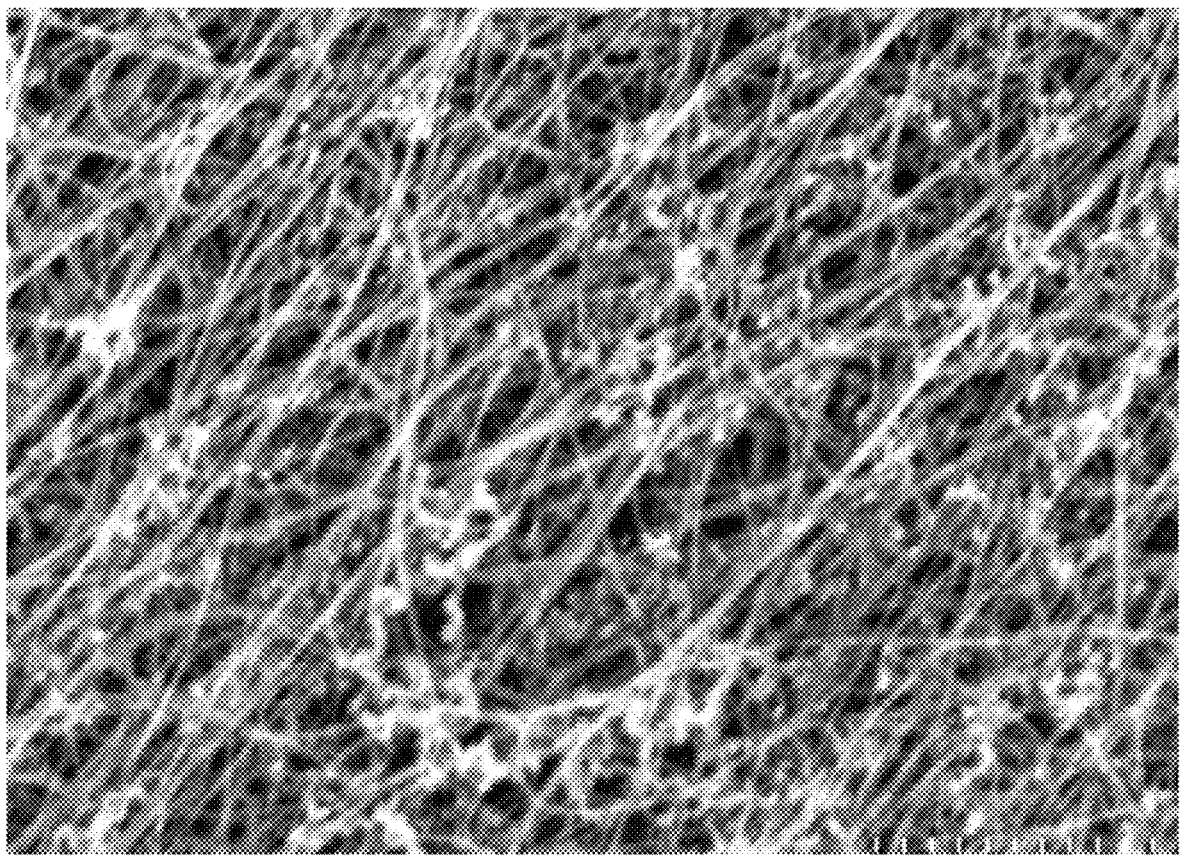
FIG. 4 is a scanning electron microscopy (SEM) image showing a large number of particles attached to pristine CNTs.

CNT growth in FCCVD furnace at high temperature (1000° C. to 1200° C.) happens very fast (typically within seconds) and the grown CNTs are pulled out of the furnace simultaneously. Amorphous carbon inevitably forms during the process. An SEM image shows large number of particles attached to pristine CNTs (FIG. 4). It is also reasonable to assume there are numerous structural defects in as-grown CNTs. Once CNTs are wound into CNT film membranes, much of amorphous carbon is embedded and becomes difficult to remove.

Amorphous carbon and structural defects in the CNT film present a few challenges: 1) the film physical strength is compromised due to weaker adhesion/bundling between individual CNTs; 2) CNT loss due to CNT adhesion to other surfaces; 3) CNT surface deposition of polymers or small molecules becomes difficult; 4) CNT film becomes hydrophobic; and 5) the quality of CNT film is difficult to control as amorphous carbon and structural defects readily affects CNT surface properties. It is therefore requisite to purify CNT by removing amorphous carbon and mending structural defects in CNT in order to produce CNT film membranes that meet the requirements as filtration membrane.

Thermal gravimetric analysis (TGA) indicates CNTs burns off rapidly between 600° C. and 750° C. in air. Amorphous carbon reacts faster with oxygen in air than CNTs. Therefore, heating CNT film in air can quickly remove amorphous carbon on film surface, but much of amorphous carbon inside the film remains. Heating CNT film in air also damages CNTs on film surface and results in more defects in CNT structure and shortens CNTs. Such structural defects further compromise CNT film physical integrity and chemical stability.

But CNTs are very stable at high temperature under inert atmosphere. It has been found that annealing CNT film at 1000° C. or above under inert atmosphere can effectively remove amorphous carbon and result in CNTs with considerably smoother surface and likely higher crystallinity. The annealing process presumably also contributes to mending structural defects in CNTs.

Figure 5:
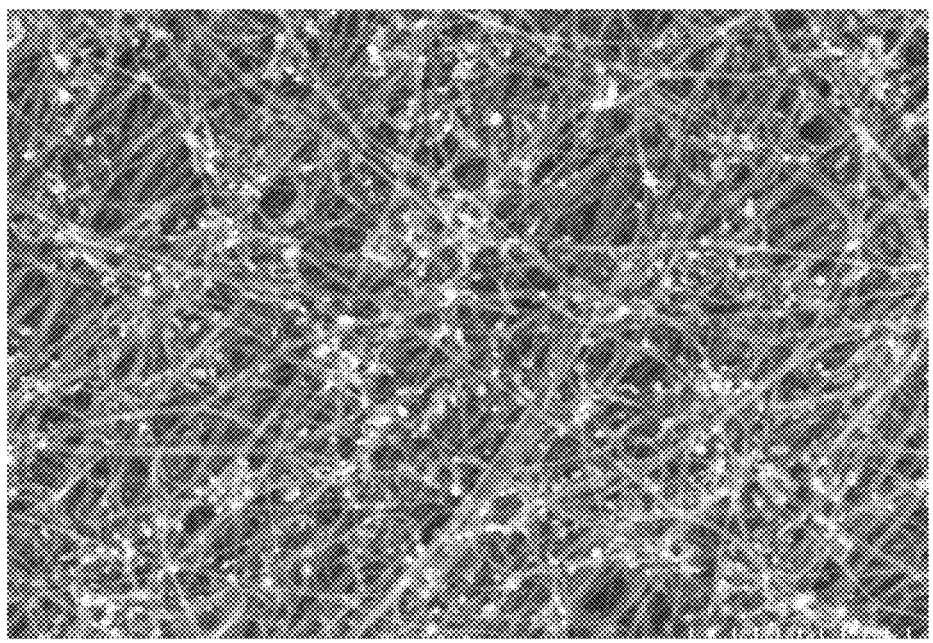
FIG. 5 shows SEM images of CNT films (A) after heat treatment at 600° C. for 100 minutes showing considerable amount of amorphous carbon still remaining; (B) after heat treatment at 800° C. for 80 minutes showing less amount of amorphous carbon present.
Figure 5:
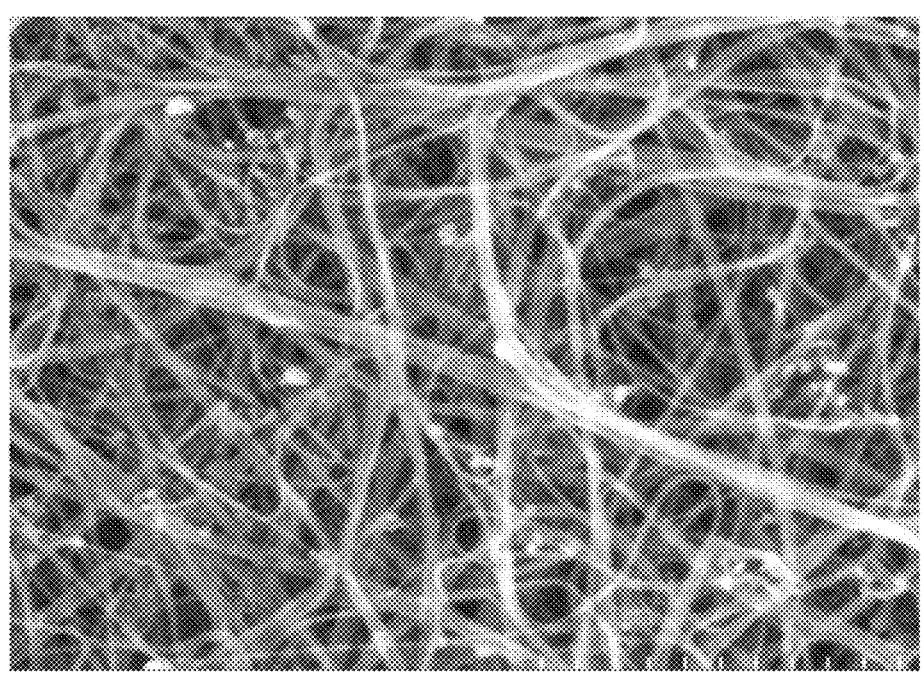

Annealing of CNT film leads to significant weight loss. Typically, at 500° C./5 hours or 600° C./100 min, the weight loss is between 10-15%. SEM images indicate the presence of significant number of residual particles attached to CNTs (FIG. 5A) after treatment at 600° C./100 min.

At 800° C./80 min, CNT film weight loss increases slightly to 10-20% with considerable improvement in the removal of large particles attached to CNTs. CNTs appear considerably cleaner (FIG. 5B) than those after 500° C./5 hours or 600° C./100 min annealing treatment.

Figure 6:
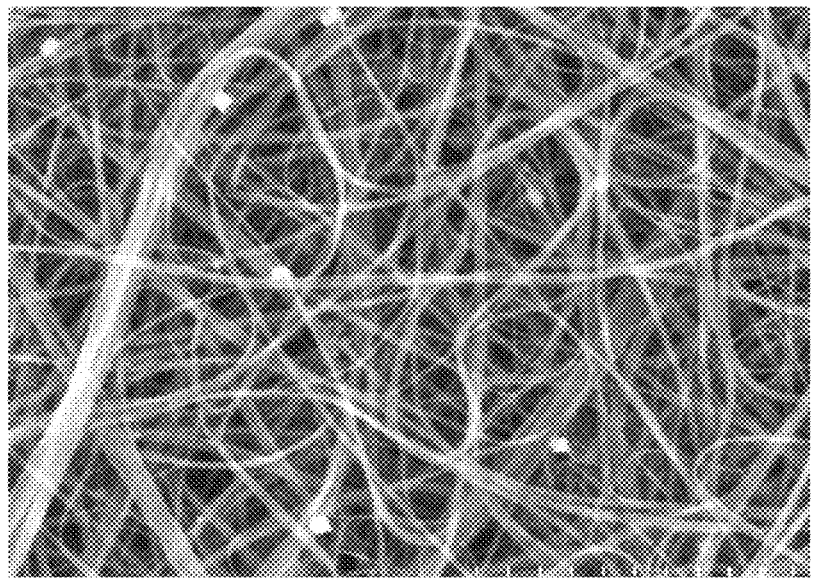
FIG. 6 shows SEM images of CNT films (A) after heat treatment at 1000° C. for 2 hours showing very little particle or amorphous carbon remaining; (B) after heat treatment at 1200° C. for 1 hour showing thin, clean and smooth CNT without amorphous carbon.
Figure 6:
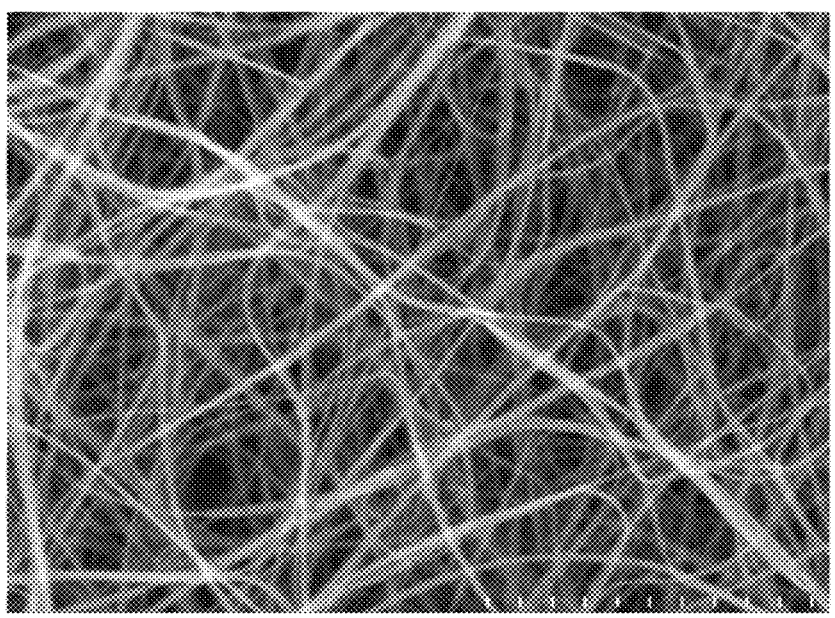

Annealing at 1000° C./1 hour and 1000° C./2 hours results in clean CNTs with much higher weight loss (25-50%). Higher weight loss is most likely correlated with less crystalline CNTs and more amorphous carbon content in CNT film. CNT surface also appears smoother. Most of carbon particles are removed. Only a few white particles are still present (FIG. 6A).

Annealing at 1200° C./1 hour leads to significant weight loss (>60%) under inert atmosphere. The remaining CNTs appear thin, clean and smooth (FIG. 6B), suggesting annealing remove amorphous carbon and lead to fewer CNT structural defects.

CNT film membranes are highly hydrophilic after annealing under inert atmosphere and can be used for water filtration. The CNT film membrane, however, is prone to rupture under shear or pressure. When such film is pressed against a hard surface such as Teflon, visible CNT loss is generally observed.

Another embodiment of the present disclosure provides a method to minimize CNT loss from CNT film. It is believed that when CNTs have significant amount of amorphous carbon and are not long enough, the force of bundling/binding is not sufficiently strong to hold all CNTs together within the film. A major issue is the loss of CNTs when CNT film is pressed against other solid surfaces. For example, some CNTs almost invariably adhere to Teflon surface when a CNT film is pressed underneath a Teflon ring. Visible CNT loss is also observed when a film is pressed against Nylon membrane or metal block.

Heating CNT film membrane at high temperature is possible to further shorten CNTs and lead to more significant CNT loss. It is therefore requisite that an effective method be developed to minimize or eliminate CNT loss.

Heating a pristine CNT film membrane at 500° C. for 5 hours in the presence of graphite paper under inert atmosphere results in a CNT film with significant water flux improvement when tested in a Millipore stainless steel syringe filter holder. Noticeably, no CNT loss is visible on Teflon surface after such a CNT film is pressed underneath a Teflon ring.

CNT films after initial heat treatment at 300° C. for 16 hours, 500° C. for 5 hours, 600° C. for 100 min, or 1000° C. for 1 hour can be further treated in the presence of graphite paper under inert atmosphere at 500° C. for 5 hours to result in CNT films with high water flux when tested in a Millipore stainless steel syringe filter holder. Such CNT films show no CNT loss on Teflon surface after being pressed underneath a Teflon ring.

A process of further densifying purified CNT film is also provided to eliminate CNT loss from purified CNT film. The process may include treating the purified CNT film with an alkylphosphonic acid having the formula: $C_nH_{2n+1}PO_3H_2$, wherein n is an integer ranging from 1-18 at a temperature between about 120° C. and about 200° C. for at least about 10 hours, at least about 20 hours, at least about 24 hours, or at least about 48 hours.

In some embodiments, another process of further densifying purified CNT film may include treating the purified CNT film with an alkyldiphosphonic acid of formula $H_2O_3P(CH_2)_nPO_3H_2$, wherein n is an integer of 6-18 at a temperature between about 120° C. and about 200° C. for at least about 10 hours, at least about 20 hours, at least about 24 hours, or at least about 48 hours.

Physical means to densify CNT film is not effective because CNT film membranes are generally thinner than 50 μm. Loss of CNT is a major problem due to CNT adhering to pressing flat surface. The length of CNTs in CNT film could also vary which can have a significant impact on how CNTs interact with each other. When the adhesion force between CNTs is not sufficiently strong, CNT loss during process handling becomes more severe.

There is intrinsic driving force for CNTs to bundle together and densify to decrease overall surface area. This effect is especially prominent when solvents evaporate from CNTs. Densification, however, is far from the molecular and nano-scale. The inter-tube distance is still too large for CNTs to have strong tube-tube interaction. As a result, CNT films are generally flimsy and easy to rupture, even though individual CNTs have very strong tensile strength. In order to densify CNTs in a film to prepare CNT filtration membrane, a molecular approach is required.

It is generally believed that CNTs are hydrophobic and, therefore, should interact strongly with hydrophobic molecule such as alkanes and hydrophobic polymers. But contrary to general assumption, such CNTs do not interact well with nonpolar molecules such as octadecane and hexatriacontane. CNT film treated with octadecane and hexatriacontane at elevated temperature does not have weight increase at all after rinsing with hexanes. Deposition of a hydrophobic polymer onto a CNT film is challenging because CNTs are not dispersed and it is unlikely to uniformly deposit polymer on all CNTs as polymer chains are entangled. The cohesion force among polymer molecules is greater than the adhesion force between CNTs and polymer molecules. As a result, even in cases where there is visible polymer deposition, CNTs and polymer chains are not fully integrated to result in stable deposition.

On the other hand, CNTs, after annealing at high temperature, can interact with small molecules having polar functional groups such as $H_2O$, MeOH, EtOH, n-PrOH, i-PrOH, n-BuOH, tert-BuOH, n-$C_{18}H_{37}$OH, ethylene glycol, 1,4-butanediol, or 1,12-dodecanediol. Deposition of simple alcohol onto CNTs typically results in weight gain of less than 10%. It appears that a balanced polar to nonpolar composition ratio is also critical. For example, glycerol does not appear to deposit onto CNTs, likely due to strong adhesion force among glycerol molecules.

Deposition of alcohol molecules with one —OH group such as MeOH and n-$C_{18}H_{37}$OH onto CNT is not particularly significant. But with diols such as ethylene glycol, 1,4-butanediol and 1,12-dodecanediol, the deposition appears more readily measurable with weight increase.

In all instances, the densification of CNTs with alcohols is not enough to strengthen a CNT film membrane for use in filtration. CNT loss is still readily visible when CNT film is pressed with a Teflon rod.

Alkyl phosphonic acids appear to interact more favorably with annealed CNTs. CNT films deposited with n-octadecylphosphonic acid, n-hexadecylphosphonic acid, n-octylphosphonic acid, and the like become substantially hydrophobic and water permeation drops significantly. This type of CNT films can be used to filter hydrophobic solvents such as jet fuel to remove water. They can potentially be used to filter water under high operating pressure as in desalination process.

Densified CNT films with deposition and/or adsorption of alkyl phosphonic acid can be further treated at high temperature (e.g., 500° C./5 hours) to result in CNT films that are substantially more hydrophilic with higher permeation for water and without CNT loss. These hydrophilic densified CNT films have narrow pore size distribution with controllable pore sizes below 100 nm. When used as a filtration membrane to filter bovine serum albumin (BSA) solution, these CNT films show little or no fouling.

Examples 1-25 Water Permeation Testing

Unmodified CNT films are typically impermeable to water under moderate pressure. A CNT film coupon (~2.0 mg, 25 mm in diameter) was placed in a Millipore stainless steel syringe filter holder, which was attached to a polypropylene syringe. The syringe plunger was pressed with both hands and no permeation of water could be observed after more than 1 minute.

Treating unmodified CNT film with water alone is not effective in improving water permeation. For example, a CNT film coupon (~2.0 mg, 25 mm in diameter) was placed in a vacuum chamber and was heated at 100° C. for 2 hours and deionized water was introduced to cover the coupon. After 24 hoursours, the vacuum was released and the CNT film was tested in a Millipore stainless steel syringe filter holder for water permeation as described above. A water flux of 1.20 g/min was obtained. Continued soaking of the CNT film in water did not increase the flux. Upon drying the CNT film in air for 3 days, the water flux dropped to <0.5 g/m in.

A CNT film coupon (2.27 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 100° C. for 20 hours. Upon cooling, the CNT coupon was removed, weighed (2.20 mg), immersed in water, placed on a Nylon film support and then assembled in a Millipore stainless steel syringe filter holder to test its flux with water. The syringe plunger was pressed with both hands and no permeation of water could be observed after more than 1 minute. Thus, heating at 100° C. for extended period of time (20 h) is not sufficient to improve CNT film membrane water permeation.

A CNT film coupon (2.26 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 150° C. for 10 hours. Upon cooling, the CNT coupon was removed from the furnace, weighed (2.18 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 2.88 g/30 sec. Thus, heating at 150° C. for extended period of time (10 h) is able to improve CNT film membrane water permeation.

A CNT film coupon (2.15 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 150° C. for 20 hours. Upon cooling, the CNT coupon was removed, weighed (2.05 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 4.12 g/30 sec. Thus, heating at 150° C. for extended period of time (20 h) is able to significantly improve CNT film membrane water permeation.

A CNT film coupon (2.18 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 200° C. for 10 hours. Upon cooling, the CNT coupon was removed, weighed (2.00 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 4.93 g/30 sec. Thus, heating at 200° C. for extended period of time (10 h) is sufficient to significantly improve CNT film membrane water permeation.

A CNT film coupon (2.10 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 200° C. for 20 hours. Upon cooling, the CNT coupon was removed, weighed (2.00 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 5.24 g/30 sec. Thus, heating at 200° C. for extended period of time (20 h) is sufficient to significantly improve CNT film membrane water permeation.

A CNT film coupon (2.28 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 300° C. for 16 hours. Upon cooling, the CNT coupon was removed, weighed (2.12 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 4.26 g/30 sec. Thus, heating at 300° C. for extended period of time (16 h) is sufficient to significantly improve CNT film membrane water permeation.

A CNT film coupon (2.59 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 5 hours. Upon cooling, the CNT coupon was removed, weighed (2.39 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 3.68 g/30 sec. Thus, heating at 500° C. for extended period of time (5 h) is sufficient to significantly improve CNT film membrane water permeation.

A CNT film coupon (2.43 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 10 hours. Upon cooling, the CNT coupon was removed, weighed (2.16 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 4.06 g/30 sec. Thus, heating at 500° C. for extended period of time (10 h) is sufficient to significantly improve CNT film membrane water permeation.

A CNT film coupon (2.54 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 15 hours. Upon cooling, the CNT coupon was removed, weighed (2.41 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 3.62 g/30 sec. Thus, heating at 500° C. for extended period of time (15 h) is sufficient to significantly improve CNT film membrane water permeation.

A CNT film coupon (2.29 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 600° C. for 100 minutes. Upon cooling, the CNT coupon was removed, weighed (2.09 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 5.84 g/30 sec. Thus, heating at 600° C. for extended period of time (100 min) is sufficient to significantly improve CNT film membrane water permeation.

A CNT film coupon (2.12 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 800° C. for 80 minutes. Upon cooling, the CNT coupon was removed, weighed (1.52 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 8.60 g/30 sec. Thus, heating at 800° C. for extended period of time (80 min) is sufficient to significantly improve CNT film membrane water permeation.

A CNT film coupon (2.66 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 800° C. for 140 minutes. Upon cooling, the CNT coupon was removed, weighed (2.21 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 6.86 g/30 sec. Thus, heating at 800° C. for extended period of time (140 min) is sufficient to significantly improve CNT film membrane water permeation.

A CNT film coupon (2.58 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 1000° C. for 1 hour. Upon cooling, the CNT coupon was removed, weighed (1.36 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 7.33 g/30 sec. Thus, heating at 1000° C. for extended period of time (1 hour) is sufficient to significantly improve CNT film membrane water permeation.

A CNT film coupon (2.51 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 1000° C. for 2 hour. Upon cooling, the CNT coupon was removed, weighed (1.17 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 8.45 g/30 sec. Thus, heating at 1000° C. for extended period of time (2 hours) is sufficient to significantly improve CNT film membrane water permeation.

A CNT film coupon (2.17 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 1000° C. for 4 hours. Upon cooling, the CNT coupon was removed, weighed (1.17 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 7.81 g/30 sec. Thus, heating at 1000° C. for extended period of time (4 hours) is sufficient to significantly improve CNT film membrane water permeation.

A CNT film coupon (2.62 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 1000° C. for 5 hours. Upon cooling, the CNT coupon was removed, weighed (1.53 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 7.70 g/30 sec. Thus, heating at 1000° C. for extended period of time (5 hours) is sufficient to significantly improve CNT film membrane water permeation.

A large CNT film (5.8 cm×7.5 cm, 25.07 mg) was placed on an $Al_2O_3$ plate in a tube furnace. Residual oxygen in tube furnace was removed following 4 cycles of $N_2$ purge and vacuum. The tube furnace was then protected under constant $N_2$ flow and heated at 1000° C. for 2 hours. Upon cooling, the CNT coupon was removed, weighed (16.13 mg) and immersed in water. The film was placed on a Nylon film support and assembled in a Sterlitech flow cell (CF016SS) to test for water permeation. The flux maintained above 300 $L/m^2 \cdot h \cdot bar$ after 1 hour under flow at 20 psi, indicating the hydrophilicity of the CNT film membrane after treatment at elevated temperature.

Without going through heat treatment, a large CNT film (5.8 cm×7.5 cm, 25.67 mg) was placed on a Nylon film support and assembled in a Sterlitech flow cell (CF016SS) to test for water permeation. No flux was observed at 20 psi for 20 min. At 100 psi, the flux reached about 10 $L/m^2 \cdot h \cdot bar$, further indicating the hydrophobicity of the CNT film membrane without heat treatment.

A circular CNT film coupon (2.20 mg) was placed next to a graphite paper (0.1466 g) on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 5 hours. Upon cooling, the CNT coupon was removed, weighed (2.09 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 5.96 g/30 sec. No CNT loss was visible on Teflon ring surface. Thus, heating CNT film in the presence of graphite paper at 500° C. for 5 hours can significantly improve CNT film membrane integrity.

A circular CNT film coupon (2.34 mg) after heat treatment at 300° C. for 16 hours showed improved water flux and visible CNT loss on Teflon ring surface. It was then placed next to a graphite paper (0.1542 g) on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 5 hours. Upon cooling, the CNT coupon was removed, weighed (2.39 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 4.33 g/30 sec. No CNT loss was visible on Teflon ring surface. Thus, heating CNT film in the presence of graphite paper at 500° C. for 5 hours can significantly improve CNT film membrane integrity.

A circular CNT film coupon (1.91 mg) after heat treatment at 500° C. for 5 hours showed improved water flux and visible CNT loss on Teflon ring surface. It was then placed next to a graphite paper (0.1542 g) on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 5 hours. Upon cooling, the CNT coupon was removed, weighed (2.04 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 3.86 g/30 sec. No CNT loss was visible on Teflon ring surface. Thus, heating CNT film in the presence of graphite paper at 500° C. for 5 hours can significantly improve CNT film membrane integrity.

A circular CNT film coupon (2.09 mg) after heat treatment at 600° C. for 100 min showed improved water flux and visible CNT loss on Teflon ring surface. It was then placed next to a graphite paper (0.1542 g) on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 5 hours. Upon cooling, the CNT coupon was removed, weighed (2.20 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 4.06 g/30 sec. No CNT loss was visible on Teflon ring surface. Thus, heating CNT film in the presence of graphite paper at 500° C. for 5 hours can significantly improve CNT film membrane integrity.

A circular CNT film coupon (1.36 mg) after heat treatment at 1000° C. for 1 hour showed improved water flux and visible CNT loss on Teflon ring surface. It was then placed next to a graphite paper (0.1542 g) on an $Al_2O_3$ plate in a tube furnace. Residual oxygen in tube furnace was removed following 4 cycles of $N_2$ purge and vacuum. The tube furnace was then protected under constant $N_2$ flow and heated at 500° C. for 5 hours. Upon cooling, the CNT coupon was removed, weighed (1.47 mg), immersed in water, placed on a Nylon film support and then assembled in a Millipore stainless steel syringe filter holder to test its flux with water. The syringe plunger was pressed with both hands and water permeated through CNT film membrane was collected and weighed and the flux rate was calculated to be 5.74 g/30 sec. No CNT loss was visible on Teflon ring surface. Thus, heating CNT film in the presence of graphite paper at 500° C. for 5 hours can significantly improve CNT film membrane integrity.

Examples 26-36 Adsorption of Water and Alcohol Molecules by Heat Treated CNT Film A circular CNT film coupon (2.31 mg) after heat treatment at 600° C. for 100 min was weighed (1.79 mg), then wet and tested for flux. Upon drying in air for 3 days, the film weighed 1.85 mg. Upon storage in air for 7 weeks with occasional wetting and drying process, the film weight increased to 1.98 mg, suggesting water molecules can interact with CNTs.

A circular CNT film coupon (2.27 mg) after heat treatment at 600° C. for 100 min was weighed (1.74 mg), then placed in a tightly capped vial and soaked with MeOH (0.5 mL) for 3 days at 30° C. The CNT film was then dried in air for 24 hours and weighed (1.77 mg). Upon storage in air for 7 weeks with occasional wetting and drying process, the film weight increased to 1.90 mg, suggesting MeOH and water molecules can interact with CNTs.

A circular CNT film coupon (2.60 mg) after heat treatment at 600° C. for 100 min was weighed (2.04 mg), then placed in a tightly capped vial and soaked with EtOH (0.5 mL) for 3 days at 30° C. The CNT film was then dried in air for 24 hours and weighed (2.08 mg). Upon storage in air for 6 weeks with occasional wetting and drying process, the film weight increased to 2.14 mg, suggesting EtOH and water molecules can interact with CNTs.

A circular CNT film coupon (2.45 mg) after heat treatment at 600° C. for 100 min was weighed (0.99 mg), then placed in a tightly capped vial and soaked with n-PrOH (0.5 mL) for 24 hours at rt. The CNT film was rinsed with water and dried in air for 24 hours and weighed (1.06 mg). Upon storage in air for 3 weeks, the film weight remained at 1.06 mg, suggesting n-PrOH and water molecules can interact with CNTs.

A circular CNT film coupon (1.76 mg) after heat treatment at 600° C. for 100 min was weighed (1.24 mg), then placed in a tightly capped vial and soaked with i-PrOH (0.5 mL) for 3 days at 30° C. The CNT film dried in air for 24 hours and weighed (1.23 mg). Upon storage in air for 2 weeks, the film weight increased to 1.36 mg, suggesting i-PrOH and water molecules can interact with CNTs.

A circular CNT film coupon (1.87 mg) after heat treatment at 1000° C. for 120 min was weighed (0.50 mg), then placed in a tightly capped vial and treated with n-BuOH (25 µL) for 24 hours at rt. The CNT film was rinsed with water and dried in air for 24 hours and weighed (0.57 mg). Upon storage in air for 7 months, the film weight dropped to 0.54 mg, suggesting n-BuOH and water molecules can interact with CNTs.

A circular CNT film coupon (2.25 mg) after heat treatment at 1000° C. for 120 min was weighed (0.64 mg), then placed in a tightly capped vial and treated with tert-BuOH (25 µL) for 24 hours at rt. The CNT film was soaked with water overnight before it was dislodged from the glass vial and dried in air for 4 days and weighed (0.68 mg). Upon storage in air for 1 week, the film weight increased to 0.73 mg and stayed at 0.71 mg after another 7 months, suggesting tert-BuOH molecules can interact effectively with CNTs.

A circular CNT film coupon (2.30 mg) after heat treatment at 600° C. for 100 min was weighed (1.49 mg), then placed in a tightly capped vial and treated with n-$C_{18}H_{37}$OH (10 mg) for 16 at 100° C. The CNT film was soaked and rinsed with EtOH till the rinse became clear, and then rinsed with water and EtOH. The film was then dried in air for 3 days and weighed (1.64 mg). Upon storage in air for 4 weeks, the film weight increased to 1.65 mg, suggesting n-$C_{18}H_{37}$OH molecules can interact effectively with CNTs. The film also appeared more hydrophobic with dramatically smaller flux with water.

A circular CNT film coupon (2.02 mg) after heat treatment at 600° C. for 100 min was weighed (1.36 mg), then placed in a tightly capped vial and treated with ethylene glycol (25 µL) for 16 h at 100° C. The CNT film was soaked with EtOH to dislodge from glass vial and rinsed with water. The film was hydrophilic with large flux for water. Upon drying in air for 2 days the film weighed (1.64 mg). Upon storage in air for 3 weeks, the film weight dropped to 1.53 mg and stayed at 1.55 mg after another 6 months, suggesting ethylene glycol molecules can interact more effectively with CNTs.

A circular CNT film coupon (1.86 mg) after heat treatment at 600° C. for 100 min was weighed (1.30 mg), then placed in a tightly capped vial and treated with 1,4-butanediol (25 µL) for 16 h at 100° C. The CNT film was soaked with EtOH to dislodge from glass vial and rinsed with water. The film was hydrophilic with large flux for water. Upon drying in air for 2 days the film weighed (1.49 mg). Upon storage in air for another 6 months, the film weight remained at 1.49 mg, suggesting 1,4-butanediol molecules can interact effectively with CNTs.

A circular CNT film coupon (1.71 mg) after heat treatment at 600° C. for 100 min was weighed (1.03 mg), then placed in a tightly capped vial and treated with 1,12-dodecanediol (25 mg) for 16 h at 100° C. The CNT film was thoroughly rinsed with EtOH. Upon drying in air for 2 days the film weighed (1.64 mg). Upon storage in air for another 6 months, the film weight dropped to 1.67 mg, suggesting 1,12-dodecanediol molecules can interact effectively with CNTs.

Examples 37-51 CNT Densification with Various Alkylphosphonic Acids and Subsequent Heat Treatment A circular CNT film coupon (2.81 mg) after heat treatment at 1000° C. for 180 min was weighed (1.11 mg), then placed on Telfon board and treated with methylphosphonic acid (4.73 mg) powder. The resulting film and powder were then placed in an oven at 150° C. for 48 h before the Teflon board was removed from the oven. The cooled CNT film was dislodged from the Teflon board, rinsed with water and dried in air overnight. The dried film (2.25 mg) was soaked in MeOH for 24 hours, dried in air for 24 hours and weighed (2.22 mg) (100% weight increase from 1.11 mg). Upon storage in air for 4 days, the film remained at 2.25 mg, indicating effective deposition and/or adsorption of methylphosphonic acid on CNT.

A circular CNT film coupon (1.04 mg) after heat treatment at 1000° C. for 180 min was weighed (0.45 mg), then placed in a glass vial and treated with n-propyl phosphonic acid (1.93 mg) powder. The resulting film and powder were then placed in an oven at 150° C. for 48 h before the glass vial was removed from the oven. The cooled CNT film was dislodged from the glass vial, rinsed with water and dried in air overnight. The dried film (0.73 mg) stored in air for an additional 48 h and weighed (0.69 mg) (53% weight increase from 0.45 mg). Thus, deposition and/or adsorption of n-propyl phosphonic acid on CNT might not be as effective as that of methylphosphonic acid.

A circular CNT film coupon (2.49 mg) after heat treatment at 1000° C. for 180 min was weighed (0.99 mg), then placed on Telfon board and treated with (3-bromopropyl) phosphonic acid (4.78 mg) powder. The resulting film and powder were then placed in an oven at 150° C. for 48 h before the Teflon board was removed from the oven. The cooled CNT film was dislodged from the Teflon board, rinsed with water and dried in air overnight. The dried film (1.69 mg) was soaked in MeOH for 24 hours, dried in air for 24 hours and weighed (1.62 mg) (63% weight increase from 0.99 mg). Thus, deposition and/or adsorption of (3-bromopropyl)phosphonic acid onto CNT is not as effective as that of methylphosphonic acid, but deposition and/or adsorption is stable in MeOH.

A circular CNT film coupon (2.98 mg) after heat treatment at 1000° C. for 180 min was weighed (1.32 mg), then placed in a glass vial and treated with tert-butylphosphonic acid (5.55 mg) powder. The vial was capped and then placed on a hot plate at 195° C. for 24 hours. Upon cooling, the CNT film was dislodged from glass vial, rinsed with water and dried in air for 24 hours. The film weighed 2.04 mg (54% weight increase from 1.32 mg). The film was further soaked in MeOH for 24 hours, rinsed with water and dried in air for 24 hours before it was weighed again (1.24 mg, no weight increase after MeOH soak). Thus, deposition and/or adsorption of tert-butylphosphonic acid on CNT is not stable in MeOH.

A circular CNT film coupon (1.11 mg) after heat treatment at 1000° C. for 180 min was weighed (0.46 mg), then placed in a glass vial and treated with phenylphosphonic acid (2.27 mg) powder. The vial was capped and then placed on a hot plate at 160° C. for 24 hours. Upon cooling, the CNT film was dislodged from glass vial, rinsed with water and dried in air for 24 hours. The film weighed 0.63 mg (37% weight increase from 0.46 mg). Thus, deposition and/or adsorption of phenylphosphonic acid on CNT is not effective compared to that of methylphosphonic acid.

A circular CNT film coupon (2.74 mg) after heat treatment at 1000° C. for 180 min was weighed (1.21 mg), then placed in a Teflon beaker and treated with hexylphosphonic acid (4.85 mg) powder. The beaker was placed in oven at 150° C. for 48 h. Upon cooling, the CNT film was dislodged from Teflon beaker, rinsed with water and dried in air for 24 hours. The film weighed 2.03 mg and was soaked in MeOH for 24 hours, rinsed with water and dried in air for 24 hours to 1.92 mg (57% weight gain from 1.21 mg). Thus, deposition and/or adsorption of hexylphosphonic acid on CNT is not as effective as that of methylphosphonic acid. However, deposited and/or adsorbed hexylphosphonic acid is stable in MeOH.

A circular CNT film coupon (2.45 mg) after heat treatment at 1000° C. for 180 min was weighed (0.92 mg), then placed in a Teflon beaker and treated with n-octylphosphonic acid (3.94 mg) powder. The beaker was placed in oven at 150° C. for 48 h. Upon cooling, the CNT film was dislodged from Teflon beaker, rinsed with water and dried in air for 24 hours. The film weighed 2.05 mg and was soaked in MeOH for 24 hours, rinsed with water and dried in air for 24 hours to 1.88 mg (104% weight gain from 0.92 mg). Thus, deposition and/or adsorption of n-octylphosphonic acid on CNT is as effective as that of methylphosphonic acid. Deposited and/or adsorbed n-octylphosphonic acid is stable in MeOH.

A circular CNT film coupon (2.20 mg) after heat treatment at 1000° C. for 180 min was weighed (1.01 mg), then placed in a Teflon beaker and treated with n-decyl phosphonic acid (4.24 mg) powder. The beaker was placed in oven at 150° C. for 48 h. Upon cooling, the CNT film was dislodged from Teflon beaker, rinsed with water and dried in air for 24 hours. The film weighed 2.12 mg and was soaked in MeOH for 24 hours, rinsed with water and dried in air for 24 hours to 1.34 mg (33% weight gain from 1.01 mg). Thus, deposition and/or adsorption of n-decylphosphonic acid on CNT is not as effective as that of methylphosphonic acid.

A circular CNT film coupon (1.16 mg) after heat treatment at 1000° C. for 180 min was weighed (0.57 mg), then placed in a glass beaker and treated with n-dodecyl phosphonic acid (2.72 mg) powder. The glass beaker was placed in oven at 150° C. for 48 h. Upon cooling, the CNT film was dislodged from glass beaker, rinsed with water and dried in air for 24 hours. The film weighed 2.59 mg and was soaked in MeOH for 24 hours, rinsed with water and dried in air for 24 hours to 0.76 mg (25% weight gain from 0.57 mg). Thus, deposition and/or adsorption of n-dodecylphosphonic acid on CNT is not as effective as that of methylphosphonic acid.

A circular CNT film coupon (1.16 mg) after heat treatment at 1000° C. for 180 min was weighed (0.53 mg), then placed in a glass beaker and treated with n-tetradecyl phosphonic acid (2.49 mg) powder. The glass beaker was placed in oven at 150° C. for 48 h. Upon cooling, the CNT film was dislodged from glass beaker, rinsed with water and dried in air for 24 hours. The film weighed 2.86 mg and was soaked in MeOH for 24 hours, rinsed with water and dried in air for 24 hours to 0.89 mg (68% weight gain from 0.53 mg). Thus, deposition and/or adsorption of n-tetradecylphosphonic acid on CNT is not as effective as that of methylphosphonic acid, but considerably higher than that with n-decylphosphonic acid and n-dodecylphosphonic acid.

A circular CNT film coupon (1.43 mg) after heat treatment at 1000° C. for 180 min was weighed (0.80 mg), then placed in a glass beaker and treated with n-hexadecyl phosphonic acid (3.42 mg) powder. The glass beaker was placed in oven at 150° C. for 48 h. Upon cooling, the CNT film was dislodged from glass beaker, rinsed with water and dried in air for 24 hours. The film weighed 3.75 mg and was soaked in MeOH for 24 hours, rinsed with water and dried in air for 24 hours to 1.87 mg (134% weight gain from 0.80 mg). Thus, deposition and/or adsorption of n-hexadecylphosphonic acid on CNT is highly effective.

Figure 7:
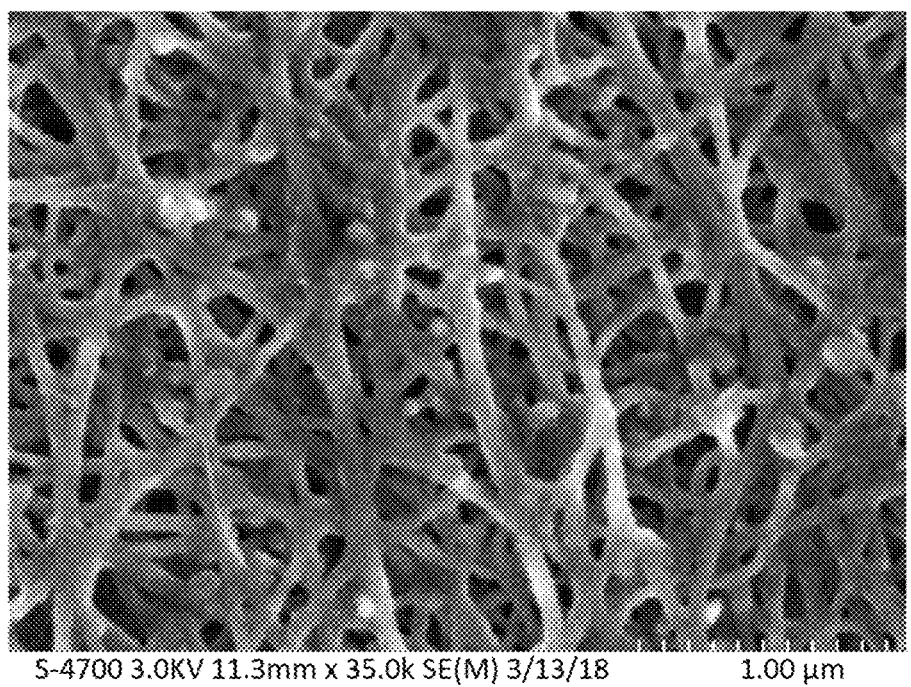
FIG. 7 shows SEM image of CNT film after sequential treatment at 1000° C. for 3 hours under $N_2$, densification with octadecylphosphonic acid at 175° C. for 20 hours, and then soak in MeOH for 24 hours, showing uniform CNT bundling and uniform deposition. The film was hydrophobic with large flux rate for hexanes but impermeable to water.

A circular CNT film coupon (2.60 mg) after heat treatment at 1000° C. for 180 min was weighed (1.31 mg), then placed in a glass beaker and treated with n-octadecyl phosphonic acid (4.59 mg) powder. The glass beaker was placed in oven at 150° C. for 48 h. Upon cooling, the CNT film was dislodged from glass beaker, rinsed with water and dried in air for 24 hours. The film weighed 5.75 mg and was soaked in MeOH for 24 hours, rinsed with water and dried in air for 24 hours to 3.81 mg (191% weight gain from 1.31 mg). Thus, deposition and/or adsorption of n-octadecylphosphonic acid on CNT is highly effective and orderly. SEM image (FIG. 7) of such a film demonstrate uniform CNT bundling and uniform deposition. The film was hydrophobic with large flux rate for hexanes but impermeable to water.

Figure 8:
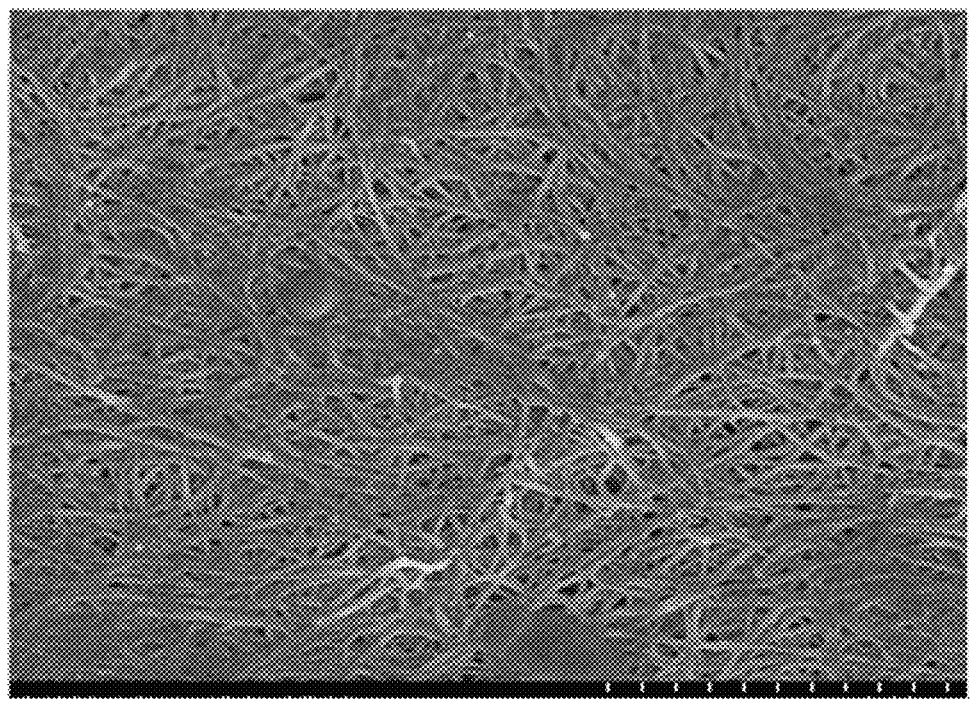
FIG. 8 shows SEM images (magnification (A) 15.0 k and (B) 30.0 k respectively) of CNT film after sequential treatment at 1000° C. for 3 hours under $N_2$, densification with octadecylphosphonic acid at 175° C. for 20 hours, and (B) final heat treatment at 500° C. for 5 hours showing uniform CNT bundling. The film was hydrophilic with contact angle of 81°.
Figure 8:
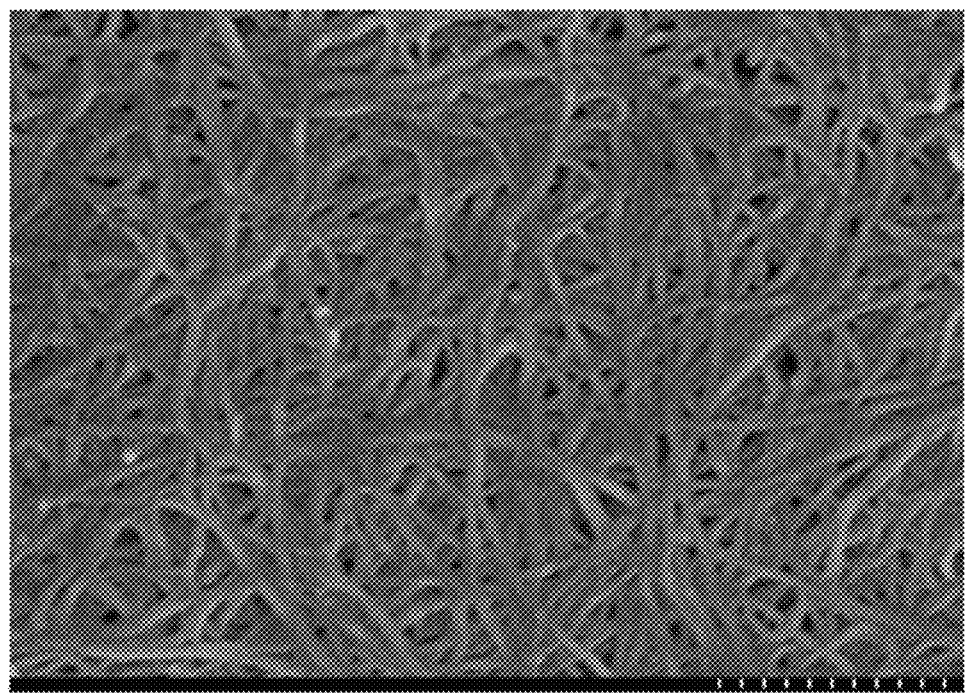
Figure 9A:
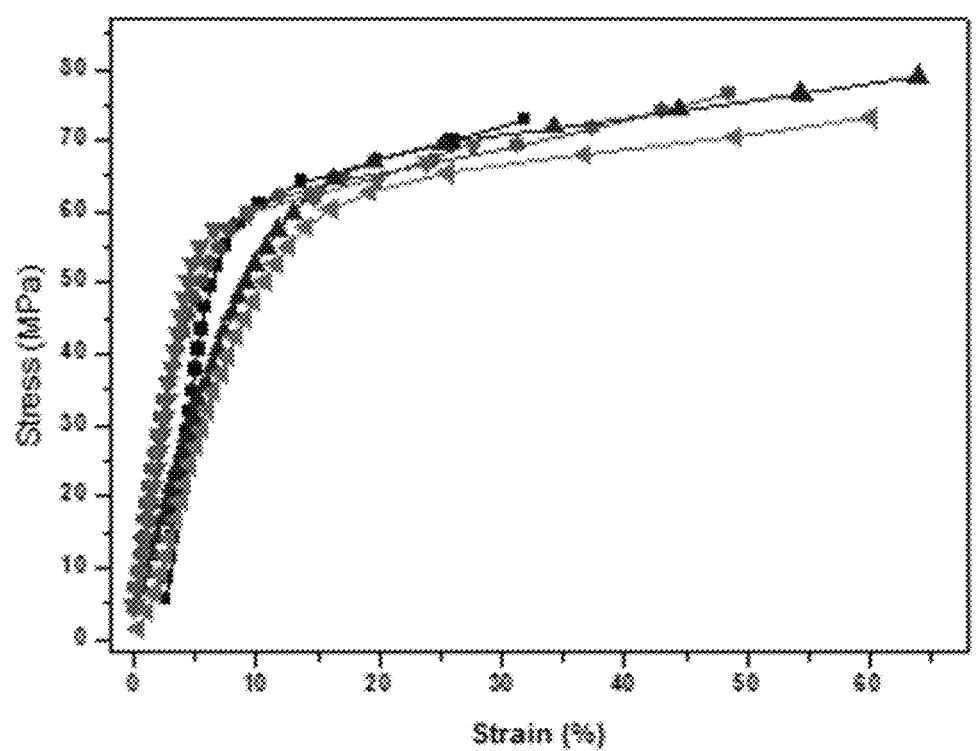
FIG. 9A shows a tensile strength comparison between a pristine CNT film (tensile strength of 70-75 MPa) and a processed CNT film (after 1000° C./4 hours heat treatment, deposition of hexadecylphosphonic acid, and heat treatment at 500° C./5 hours).
Figure 9B:
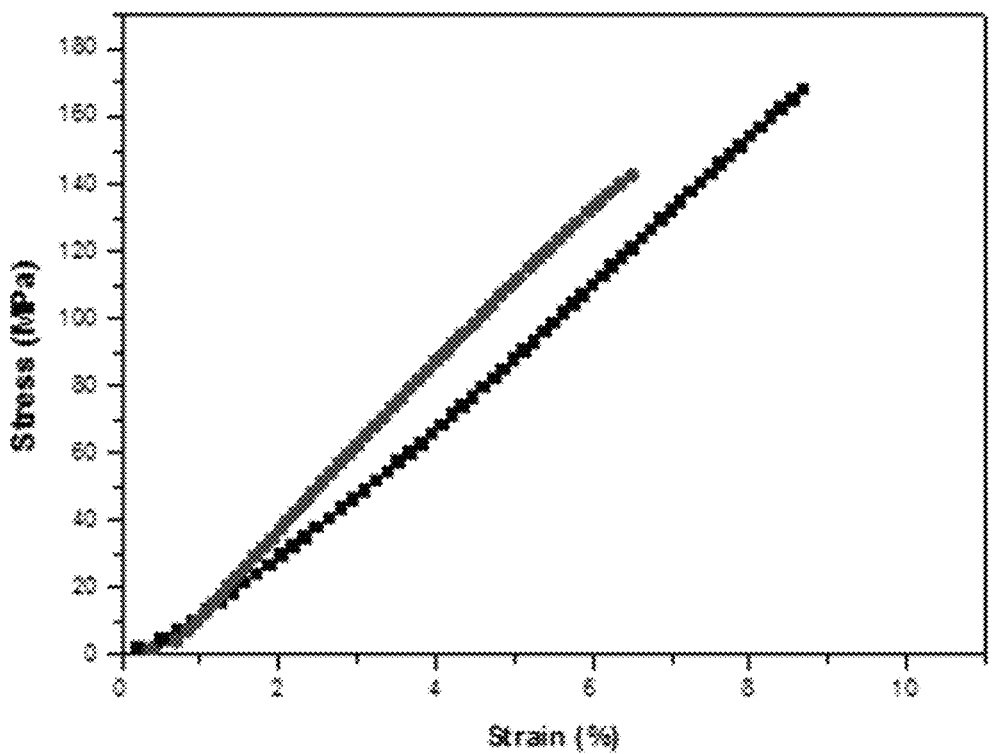
FIG. 9B shows a tensile strength comparison between a pristine CNT film (tensile strength of 140-170 MPa) and a processed CNT film (after 1000° C./4 hours heat treatment, deposition of hexadecylphosphonic acid, and heat treatment at 500° C./5 hours). Heat treatment and process with alkylphosphonic acid densify CNT film to render stronger CNT films.
Figure 10:
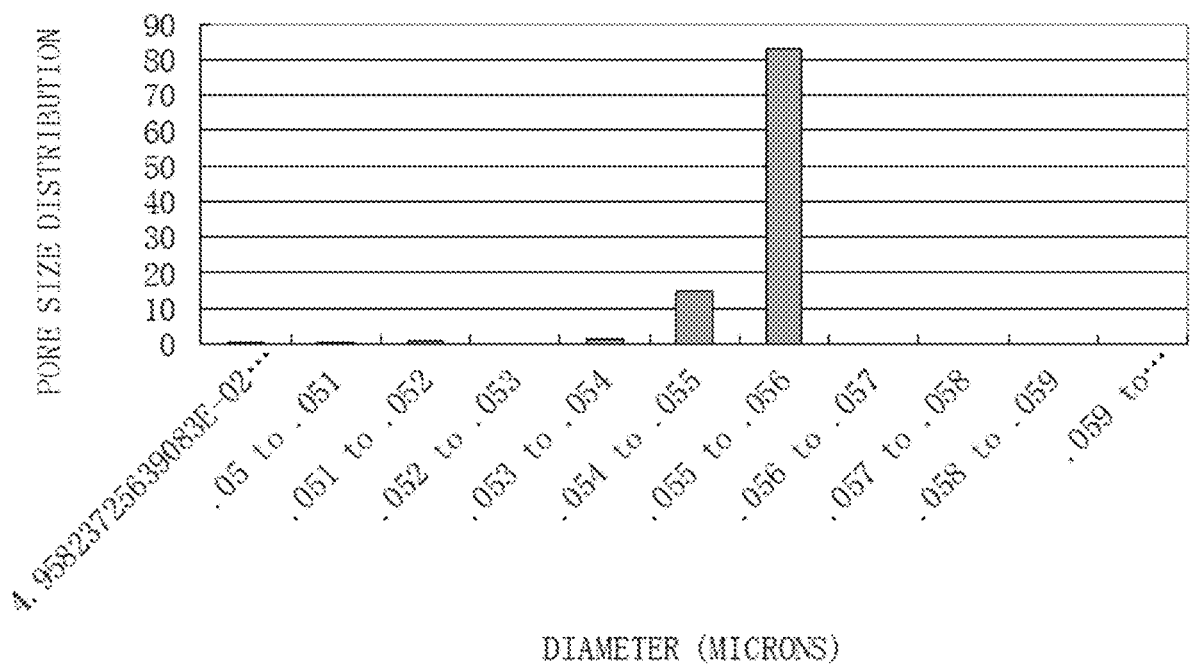
FIG. 10 shows pore size distribution analysis of a processed CNT film indicated narrow pore size distribution with a mean flow pore diameter of 55.2 nm.

A rectangular CNT film (58 mm×75 mm, 27.47 mg) after heat treatment at 1000° C. for 240 min was weighed (21.82 mg), then placed on a Teflon plate and treated with hexadecylphosphonic acid powder (76.37 mg) which was spread across the film surface. The CNT film on Teflon plate was placed in oven at 175° C. for 20 h. Upon cooling, the film was weighed (83.18 mg). The film was further heated at 500° C. for 5 h to yield a shiny film (41.28 mg, 89.2% weight increase from 21.82 mg). When pressed against Teflon rod, no visible CNT loss was visible. SEM images indicated uniform bundling and smooth tube surface (FIG. 8). The film appeared hydrophilic with contact angle ~80°. When tested at 0.1 MPa pressure, the flux rate for water could reach 500 L/($m^2$·h·atm). When tested with 1% bovine serum albumin (BSA) solution, the cut-off reached above 50%. The tensile strength of the processed film increased significantly to 140-170 MPa while that for the pristine CNT sheet was 70-75 MPa (FIG. 9). Analysis of mean flow pore diameter (55.2 nm) indicated narrow pore size distribution (FIG. 10).

A circular CNT film coupon (2.12 mg) after heat treatment at 1000° C. for 240 min was weighed (1.54 mg), then placed on a Teflon plate and treated with MeOH solution of 1,8-octyldiphosphonic acid solution (50 mg/mL, 0.108 mL, 3.5 equivalents of CNT weight). Upon drying in air, the CNT film on Teflon plate was placed in oven at 175° C. for 20 h. The flat CNT film curled up upon heating. After cooling, the CNT film was dislodged from Teflon plate, and further heated at 500° C. for 5 h. The film surface became wrinkled. After rinse with water and drying in air for 24 hours, the film weighed 2.09 mg (32% weight gain from 1.54 mg). When pressed against Teflon rod, no visible CNT loss was visible. Thus, 1,8-octyldiphosphonic acid can effectively bring CNTs closer.

A circular CNT film coupon (2.17 mg) after heat treatment at 1000° C. for 240 min was weighed (1.62 mg), then placed on a Teflon plate and treated with MeOH solution of 1,8-octyldiphosphonic acid solution (50 mg/mL, 0.065 mL, 2.0 equivalents of CNT weight). Upon drying in air, the CNT film on Teflon plate was placed in oven at 175° C. for 20 h. The flat CNT film curled up upon heating. After cooling, the CNT film was dislodged from Teflon plate, and further heated at 500° C. for 5 h. The film surface became slightly wrinkled. After rinse with water and drying in air for 24 hours, the film weighed 2.00 mg (23% weight gain from 1.62 mg). When pressed against Teflon rod, no visible CNT loss was visible. Thus, 1,8-octyldiphosphonic acid can effectively bring CNTs closer.

Figure 11:
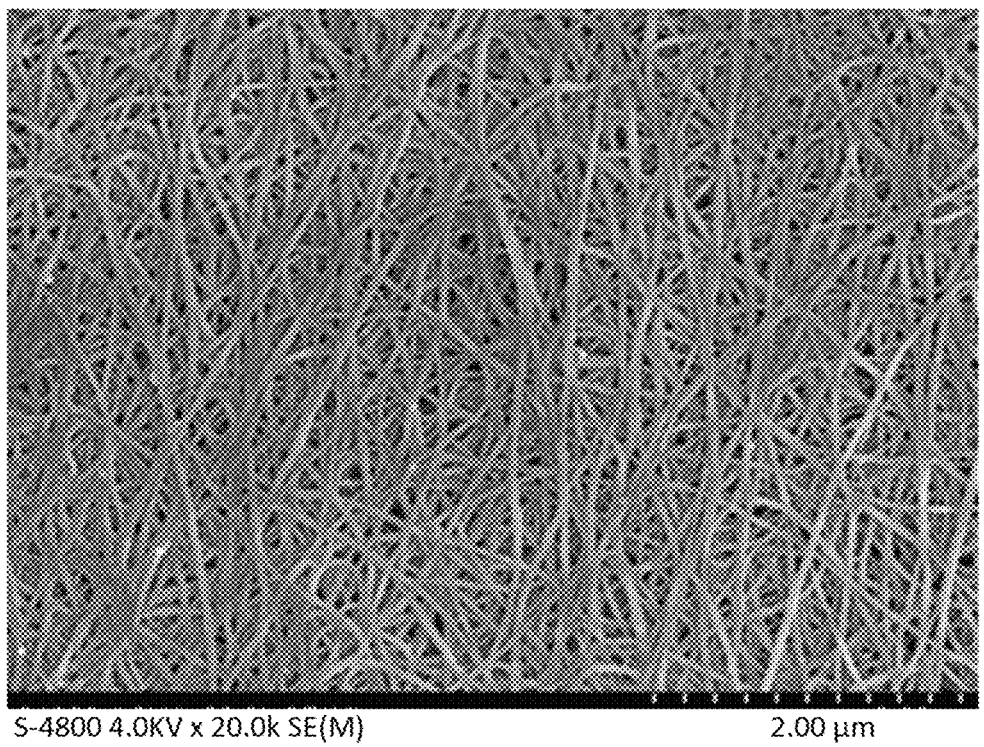
FIG. 11 shows SEM images (magnification (A) 20.0 k and (B) 50.0 k respectively) of CNT film after sequential treatment at 1000° C. for 4 hour under $N_2$, densification with 1,8-octyldiphosphonic acid at 175° C. for 20 hours, and final heat treatment at 500° C. for 5 hours showing uniform CNT bundling.
Figure 11:
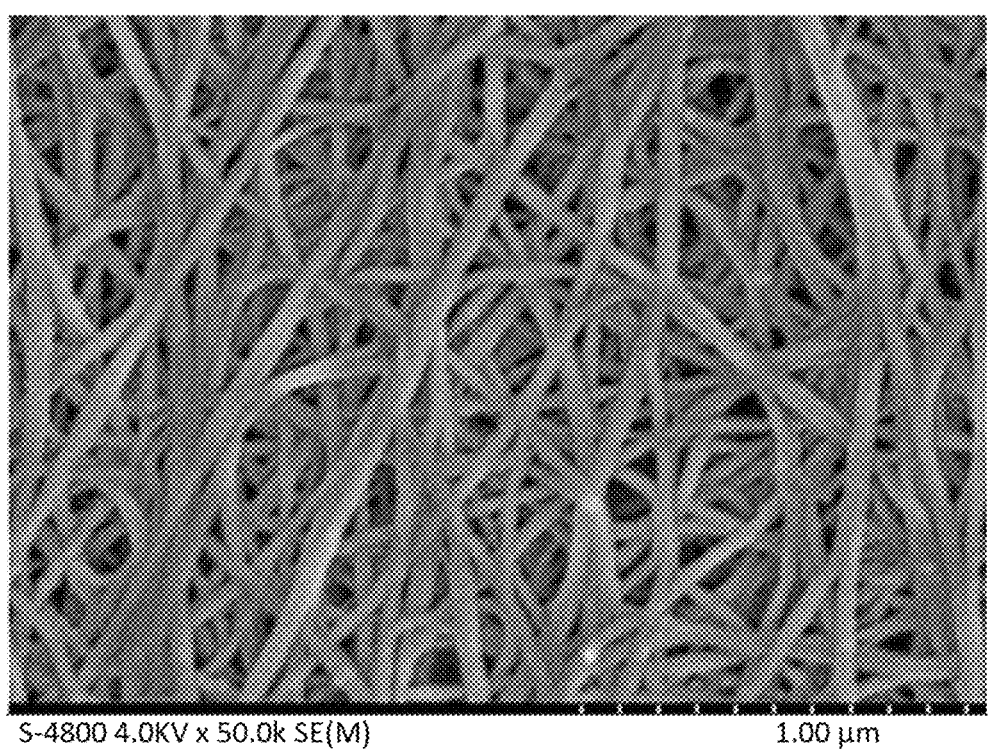
Figure 12:
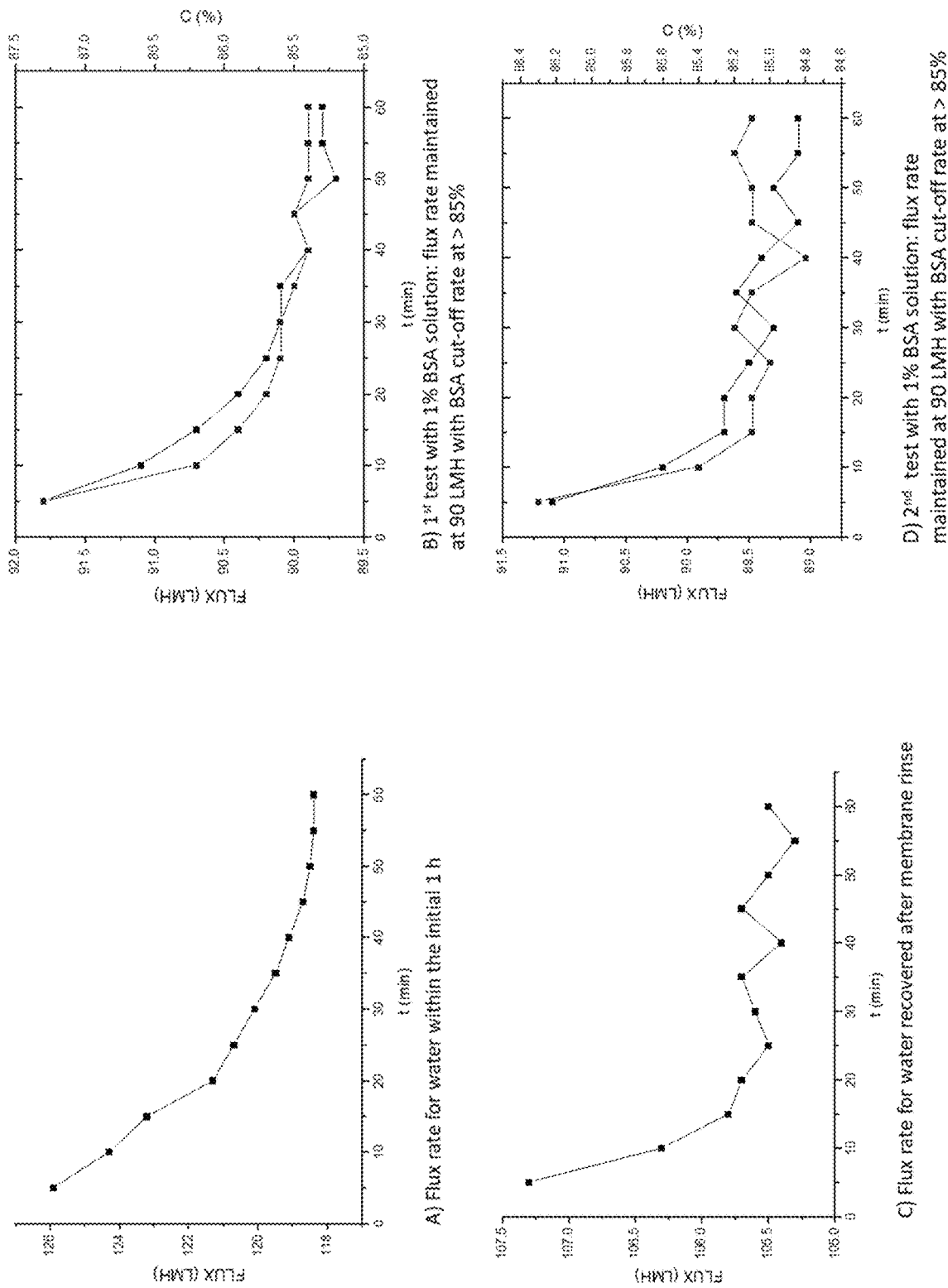
FIG. 12 shows sequential experiments to demonstrate the superior fouling resistance property of processed CNT film membrane: (A) initial test to determine the flux rate for water alone (~118 L/($m^2$·h·atm) after 1 hour; (B) flux rate maintained at ca. 90 L/($m^2$·h·atm) after 1 hour when filtered with 1% BSA solution with BSA cut-off rate at >85%; (C) flux rate for water recovered after membrane rinse; (D) flux rate maintained at ca. 90 L/($m^2$·h·atm) after 1 hour when filtered the $2^{nd}$ time with 1% BSA solution; BSA cut-off rate remained the same.

A rectangular CNT film (12.54 mg, 5 cm×5 cm in size) after heat treatment at 1000° C. for 240 min was weighed (8.67 mg), then placed on a Teflon plate and treated with MeOH solution of 1,8-octyldiphosphonic acid solution (25 mg/mL, 0.69 mL, 2.0 equivalents of CNT weight). Upon drying in air, the CNT film on Teflon plate was placed in oven at 175° C. for 20 h. After cooling, the flat CNT film was dislodged from Teflon plate. When pressed with a Teflon rod on a polyethylene surface, no CNT loss was observed on Teflon or polyethylene surface, unlike the pristine CNT film or the CNT film immediately after 1000° C. treatment. The deposited CNT film was further heated at 500° C. for 5 h to result in a somewhat shiny film with crispy sound. SEM images indicated uniform bundling of CNTs (FIG. 11). The film was hydrophilic. When pressed with Teflon rod on a polyethylene surface, no CNT loss was visible. When tested at 0.1 MPa pressure, the flux rate for water maintained at 118 L/(m$^2$·h·atm) after 1 h (FIG. 12A). When tested with 1% BSA solution, flux rate maintained at ca. 90 L/(m$^2$·h·atm) after 1 h with BSA cut-off rate at 85% (FIG. 12B). The flux rate for water recovered after membrane rinse (FIG. 12C). A $2^{nd}$ test with 1% BSA solution resulted in the same flux rate and BSA cut-off rate (FIG. 12D). These experiments demonstrated the superior fouling resistance property of processed CNT film membrane.

What is claimed is:

1. A process of densifying a carbon nanotube (CNT) film, comprising heating a CNT film prepared from a floating catalyst chemical vapor deposition (FCCVD) method to a temperature between about 600° C. and about 1200° C. under inert atmosphere for a period of time thereby removing amorphous carbon to produce a purified CNT film;
   densifying the purified CNT film by contacting the purified CNT film with an alkylphosphonic acid having the formula: $C_nH_{2n+1}PO_3H_2$, wherein n is an integer ranging from 1-18, and heating the purified film to a temperature between about 120° C. and about 200° C. for at least about 10 hours to form a densified CNT film; and
   heating the densified CNT film to a temperature between about 450° C. and 1000° C. under inert atmosphere.

2. A densified CNT film formed according to the process of claim 1.

3. A process of densifying a carbon nanotube (CNT) film, comprising:
   heating a CNT film to a temperature between about 600° C. and about 1200° C. under inert atmosphere for a period of time thereby removing amorphous carbon to produce a purified CNT film;
   densifying the purified CNT film by contacting the purified CNT film with an alkyldiphosphonic acid having the formula: $H_2O_3P(CH_2)_nPO_3H_2$, wherein n is an integer of 6-18 at a temperature between about 120° C. and about 200° C. for at least about 10 hours to form a densified CNT film.

4. The process of claim 3, further comprising heating the densified CNT film to a temperature between about 450° C. and 1000° C.

5. A densified CNT film formed according to the process of claim 4.

6. A densified CNT film formed according to the process of claim 3.

7. The process of claim 1, wherein the alkylphosphonic acid is n-hexyl phosphonic acid.

8. A densified CNT film formed according to the process of claim 7.

9. The process of claim 1, wherein the alkylphosphonic acid is n-hexadecyl phosphonic acid.

10. A densified CNT film formed according to the process of claim 9.

11. The process of claim 1, wherein the alkylphosphonic acid is n-octadecyl phosphonic acid.

12. A densified CNT film formed according to the process of claim 11.

13. A process of purifying densifying a carbon nanotube (CNT) film, comprising:
    heating a CNT film to a temperature between about 600° C. and about 1200° C. under inert atmosphere for a period of time thereby removing amorphous carbon to produce a purified CNT film;
    densifying the purified CNT film by contacting the purified CNT film with an alkylphosphonic acid having the formula: $C_nH_{2n+1}PO_3H_2$, wherein n is an integer ranging from 6-18,
    heating the purified CNT film to a temperature between about 120° C. and about 200° C. for at least about 10 hours to form a densified CNT film;
    heating the densified CNT film to a temperature between about 450° C. and 1000° C. under inert atmosphere.

14. A densified CNT film formed according to the process of claim 13.

15. The process of claim 3, wherein the alkyldiphosphonic acid is 1,8-octyl diphosphonic acid.

16. A densified CNT film formed according to the process of claim 15.

17. The process of claim 4, wherein the alkyldiphosphonic acid is 1,8-octyl diphosphonic acid.

18. A densified CNT film formed according to the process claim 17.

* * * * *

UNITED STATES PATENT AND TRADEMARK OFFICE
CERTIFICATE OF CORRECTION

PATENT NO. : 11,603,317 B2
APPLICATION NO. : 16/699264
DATED : March 14, 2023
INVENTOR(S) : Chunhong Li Page 1 of 1

It is certified that error appears in the above-identified patent and that said Letters Patent is hereby corrected as shown below:

In the Claims

Column 22, In Claim 13, Line 37, after "A process of" delete "purifying".

Signed and Sealed this
Fifth Day of March, 2024

Katherine Kelly Vidal
*Director of the United States Patent and Trademark Office*